Inventor
R Dell Hull
Willie R. Crawford

May 22, 1951 R D. HULL ET AL 2,553,589
BACKLASH PREVENTOR FOR FISHING REELS
Filed Dec. 13, 1945 2 Sheets-Sheet 2

Inventor
R Dell Hull
Willie R. Crawford

By Clarence A O'Brien
and Harvey B. Jackson
Attorneys

Patented May 22, 1951

2,553,589

UNITED STATES PATENT OFFICE 2,553,589

BACKLASH PREVENTOR FOR FISHING REELS

R Dell Hull and Willie R. Crawford, San Angelo, Tex., assignors to Castmaster Fishing Reel Corporation, Tulsa, Okla., a corporation of Delaware Application December 13, 1945, Serial No. 634,682

3 Claims. (Cl. 242—84.4)

The present invention relates to new and useful improvements in fishing reels and more particularly to an attachment for the reel to prevent over-running of the reel in casting and thus to eliminate any possibility of a backlash on the reel.

An important object of the present invention is to provide an attachment of this character which can be readily controlled by the fisherman.

A still further object of the invention is to provide a device of this character of simple and practical construction, which is neat and attractive in appearance, efficient and reliable in operation and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
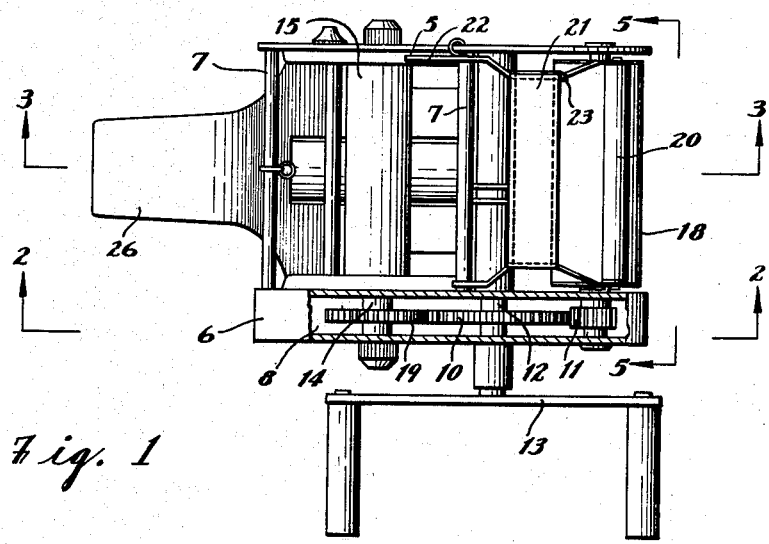
Figure 1 is a top plan view.
Figure 2:
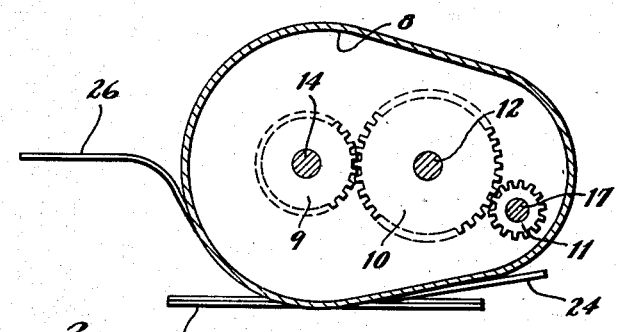
Figure 2 is a sectional view taken on the line 2—2 of Figure 1.

Referring now to the drawings in detail wherein for the purpose of illustration I have disclosed a preferred embodiment of the invention, the numerals 5 and 6 designate the side plates of the reel connected to each other in spaced parallel relation by the cross-bars 7. The side plate 6 is of hollow construction to provide a chamber 8 for the gears 9, 10, and 11, the gear 10 being secured on a transverse shaft 12 journaled in the side plates and operated by the crank handles 13.

The gear 9 is also secured to a transverse shaft 14 for the spool 15 on which the line is wound and a conventional form of spooling device 16 is operatively engaged with the shaft 12 for shifting the line from side to side on the spool 15.

The gear 11 is secured to a transverse shaft 17 journaled at the side plates 5 and 6 and on which a cork roller 18 is freely mounted. A ratcheting clutch device 19 of conventional construction is provided between the shaft 17 and one end of the roller 18 to rotate the roller 18 in one direction to provide for the free running of the spool 18 when the crank handle 13 is being turned to wind the line on the spool 15 and to provide a positive drive for the spool 18 in the same direction as the spool 15 during unwinding of the line from the spool 15, such as when the reel is used for casting.

The gears 9 and 11 are constructed of a ratio to provide for an increase in the speed of rotation of the spool 18 when casting.

An idler roller 20 is journaled at the front end of a frame 21 to ride on the upper surface of the roller 18, the frame 21 being pivoted at its rear end on one of the cross-bars 7 of the reel and is provided at its rear end with a rearwardly projecting lever 22 to raise the idler roller 20 by a depressing action on the lever. The roller 20 and frame 21 are yieldably urged downwardly in engagement with the roller 18 by means of a wire spring 23 having one end engaged with the side plate 5 and its other end engaging an edge of the frame 21.

The underside of the roller 18 is also provided with a brake 24 of sheet metal construction and having a hook 25 struck upwardly therefrom for pivotally mounting the brake on one of the lower cross-bars 7 of the reel. The front end of the brake 24 is positioned under the roller 18 while the rear end of the brake is curved upwardly and rearwardly behind the reel to form a manipulating lever or handle 26.

The brake is held out of its braking position by means of a coil spring 27 connecting the handle 26 with one of the cross bars 7 of the reel.

The bottom of the reel is provided with an attaching plate 28 for attaching the reel to a fishing pole or rod.

Figure 3:
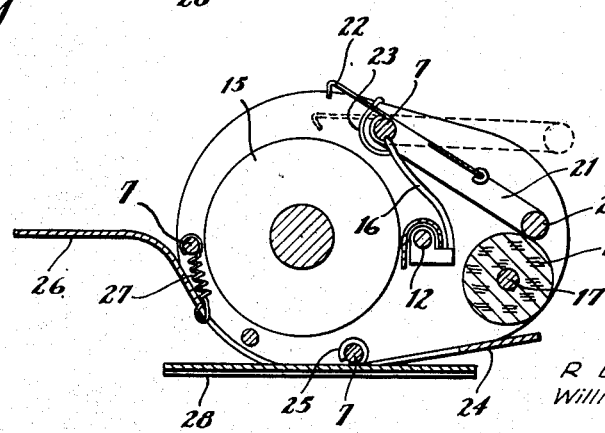
Figure 3 is a similar view taken on the line 3—3 of Figure 1.
Figure 4:
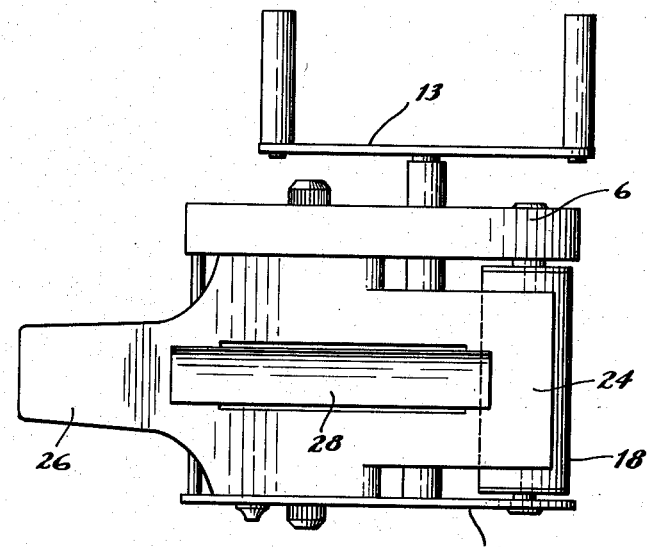
Figure 4 is a bottom plan view.
Figure 5:
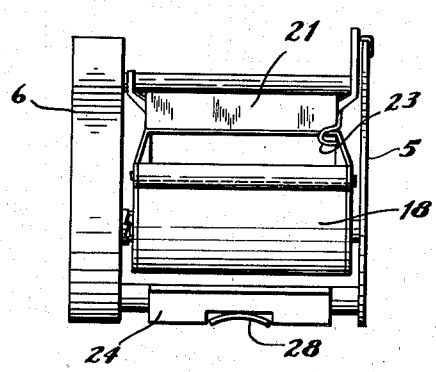
Figure 5 is a view in elevation of the front end of the reel.
Figure 6:
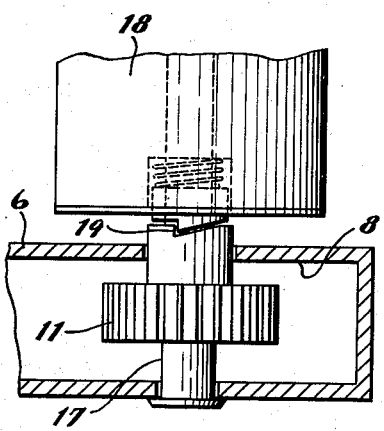
Figure 6 is an enlarged fragmentary detail of the ratcheting clutch drive for the back last preventing roller.

In the operation of the device, when casting, the line when being paid out from the roller 15 will travel forwardly between the roller 18 and roller 20, the roller 20 being raised into the dotted line position as shown in Figure 3 of the drawing by the tension on the line to prevent interference with the free paying out of the line.

As the line loses momentum the line will slacken thus permitting the roller 20 to drop with the aid of the spring 23 to thus press lightly against the cork roller 18.

By reason of the gear ratio of the gears 9 and 11 the roller 18 will turn faster than the spool 15 therefor tending to pull the slack out of the line between the roller 18 and spool 15.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What we claim is:

1. A reel comprising side plates, a spool journaled therebetween, a roller mounted between the plates, an operative connection between the spool and roller operable to drive the roller at an increased speed, an idler roller, and a pivoted mounting for the idler roller, said rollers receiving a line therebetween while being paid out from the spool and said idler roller being subjected to tension on the line to move the idler roller away from the first named roller and gravitating against the first named roller to maintain the line taut between the spool and the rollers when tension is slackened on the line, a brake shoe pivoted on the reel for movement into and out of engagement with the first named roller, and a manually operated lever for the brake shoe.

2. A fishing reel comprising a frame provided with side plates, a line spool journaled between said side plates, a driving roller rotatably mounted between said plates and driven from said spool during a casting operation to exert a pulling force on the line as it leaves said spool, a rotatable idler roller movably carried by said frame and biased toward the periphery of said driving roller for pressing the line against the periphery of said driving roller at least when tension in the line is slackened during said casting operation, and selectively operable brake means including a movable brake shoe engageable with said driving roller to brake said driving roller and said spool.

3. A fishing reel comprising a frame provided with spaced apart side plates, a line spool journaled between said side plates, a driving roller rotatably supported between said plates and extending entirely between said plates, a drive mechanism for driving said roller from said spool during a casting operation at a speed such that said driving roller tends to exert a pulling force on the line as it leaves said spool, an idler roller movably supported by said frame and extending entirely between said side plates, means biasing said idler roller toward said driving roller, whereby said idler roller acts to press the line against the periphery of said driving roller at least when tension in the line is slackened during a casting operation, a level wind mechanism positioned between said spool and said driving roller and driven from said drive mechanism to move the line back and forth between the ends of said roller during said casting operation, and selectively operable brake means including a movable brake shoe engageable with said driving roller to brake said driving roller and said spool.

R. DELL HULL.
WILLIE R. CRAWFORD.

REFERENCES CITED

The following references are of record in the file of this patent:

UNITED STATES PATENTS

| Number | Name | Date |
|---|---|---|
| 1,960,491 | Johnson | May 29, 1934 |
| 2,197,675 | Babcock | Apr. 16, 1940 |
| 2,264,514 | Faria | Dec. 2, 1941 |
| 2,380,670 | Nelson | July 31, 1945 |